United States Patent
Lewis et al.

(10) Patent No.: US 6,762,756 B2
(45) Date of Patent: Jul. 13, 2004

(54) GRAPHICS PROCESSOR, SYSTEM AND METHOD FOR GENERATING SCREEN PIXELS IN RASTER ORDER UTILIZING A SINGLE INTERPOLATOR

(75) Inventors: Michael C. Lewis, Redwood Estates, CA (US); Stephen L. Morein, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/193,812

(22) Filed: Jul. 11, 2002

(65) Prior Publication Data

US 2003/0006983 A1 Jan. 9, 2003

Related U.S. Application Data

(63) Continuation of application No. 09/329,715, filed on Jun. 10, 1999, now Pat. No. 6,456,284, which is a continuation of application No. 08/624,260, filed on Mar. 29, 1996, now Pat. No. 5,963,210.

(51) Int. Cl.$^7$ .............................................. G06T 17/00
(52) U.S. Cl. ....................................... 345/419; 345/421
(58) Field of Search ................................ 345/418, 419, 345/420, 421, 422, 423, 424, 428

(56) References Cited

U.S. PATENT DOCUMENTS

| | | | |
|---|---|---|---|
| 4,945,500 A | 7/1990 | Deering | |
| 5,345,541 A | 9/1994 | Kelley et al. | |
| 5,509,110 A | 4/1996 | Latham | |
| 5,574,835 A | 11/1996 | Duluk, Jr. et al. | |
| 5,579,455 A | 11/1996 | Greene et al. | |
| 5,596,686 A | 1/1997 | Duluk, Jr. | |
| 5,801,711 A | 9/1998 | Koss et al. | |
| 5,963,210 A | * 10/1999 | Lewis et al. ................. | 345/419 |
| 6,456,284 B1 | * 9/2002 | Lewis et al. ................. | 345/421 |

\* cited by examiner

*Primary Examiner*—Cliff N. Vo
(74) *Attorney, Agent, or Firm*—Sawyer Law Group LLP (57) ABSTRACT

A method and system for generating a graphical display from data describing at least one three-dimensional object is disclosed. The method and system include providing a plurality of processors and a single interpolator coupled with the plurality of processors. Each of the processors receive a portion of the data for one of the three-dimensional object(s), determine if a current position is located within the portion of the data, and provide an output if the current position is located within the portion of the data. The single interpolator is configured to provide information relating to characteristics of the portion of the data in the processor in response to the processor providing the output.

23 Claims, 6 Drawing Sheets

Graphics System Pipeline Based on Pixelsquirt 2

GRAPHICS PROCESSOR, SYSTEM AND METHOD FOR GENERATING SCREEN PIXELS IN RASTER ORDER UTILIZING A SINGLE INTERPOLATOR

RELATED APPLICATIONS

The subject matter of this application is related to the subject matter of application Ser. No. 08/624,261 entitled "Method and Apparatus for Identifying and Eliminating Three-Dimensional Objects Visually Obstructed from a Planar Surface" filed on Mar. 29, 1996 by Michael C. Lewis and Stephen L. Morein which is hereby incorporated by reference.

CROSS-REFERENCE TO RELATED APPLICATIONS

The present application is a continuation of prior application Ser. No. 09/329,715, filed on Jun. 10, 1999, which is a continuation of prior application Ser. No. 08/624,260, filed on Mar. 29, 1996, now issued as U.S. Pat. No. 5,963,210 on Oct. 5, 1999.

FIELD OF THE INVENTION

This invention relates generally to graphics computer systems, and more particularly to a graphics processor, system and method for generating screen pixels in raster order utilizing a single interpolator.

BACKGROUND OF THE INVENTION

In conventional computer systems, images are displayed on a two-dimensional screen. The images are defined by arrays of pixels which are either stored in computer memory or received from sources connected to the computer system.

Many images of physical objects may be defined three-dimensionally and may be stored or received as three-dimensional raw data arrays. In recent years, efforts have been undertaken to utilize three-dimensional raw data to take into account the distance and various characteristics of objects within screen images. One of the problems associated with the generation and display of such screen images is the size and complexity of circuitry and logic currently required to produce a stream of screen image data in the order required by a display. Various techniques have been developed to produce the screen data stream utilizing multi-stage graphics computer systems.

Figure 1A:
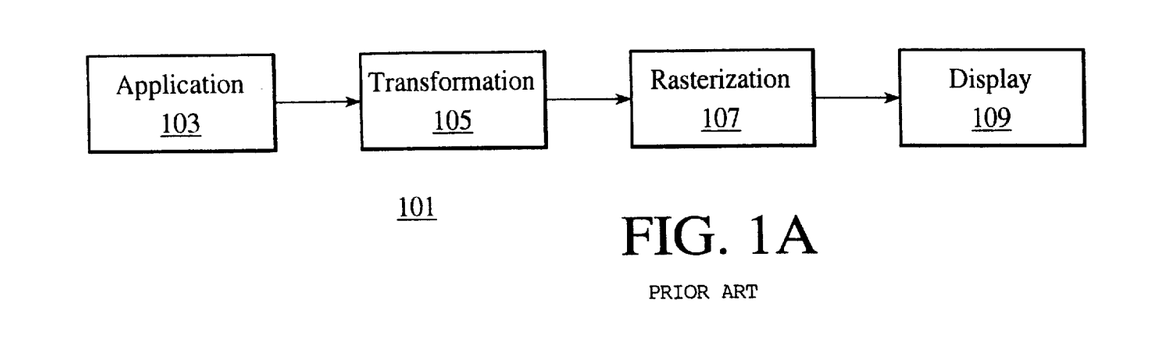
FIG. 1A is a block diagram of a graphics pipeline system according to the prior art.

One of the graphics computer systems which have been developed to produce the screen data stream is shown in FIG. 1A. Graphics computer system 101 may be implemented with a conventional X86 (such as the 400 series) IBM-compatible or MacIntosh personal computer or a graphics engine that includes application unit 103 which generates geometries that are to be rendered. The output of application unit 103 is a stream of geometry data characterized in three-dimensional space. Transformation unit 105 transforms the geometry data from three-dimensional spacial coordinates to two-dimensional display coordinates corresponding to the screen plane. Transformation unit 105 also reformats the geometry data into a more unified format. For example, transformation unit 105 may accept as input independent polygons, quad strips, concave polygons and higher and only output triangle strips. The output of transformation unit 105 includes graphics primitives readable by rasterizer 107 in display coordinates. Rasterizer 107 receives the graphics primitives and converts them to pixels which in turn are transmitted to display 109 to generate a screen image.

Figure 1B:
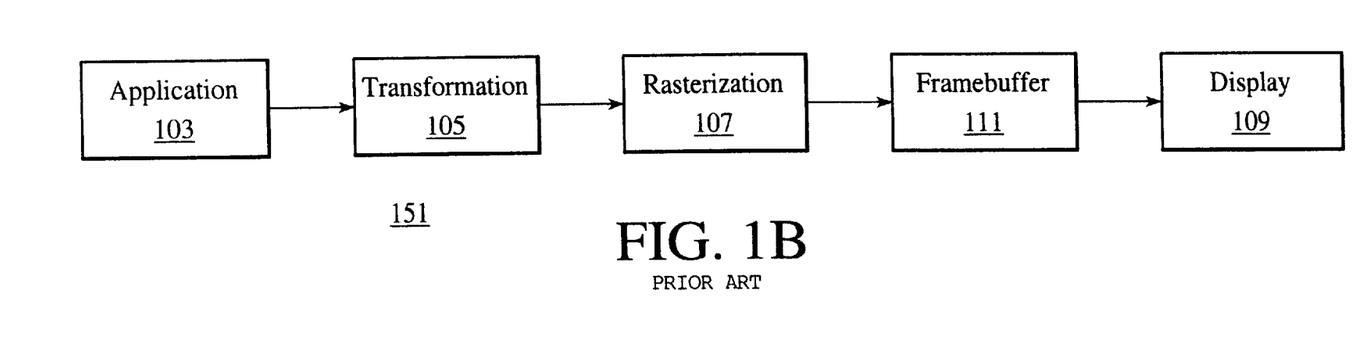
FIG. 1B is a block diagram of an alternate embodiment of a graphics computer system according to the prior art.

Another graphics computer systems which has been developed to produce the screen data stream is shown in FIG. 1B. Graphics computer system 151 is shown which includes frame buffer 111. Frame buffer 111 is utilized by system 151 to decouple the rendering process from a video refresh rate. This permits the image undergoing rendering to be updated at a slower rate than the screen image shown on display 109 is refreshed. Some implementations of rasterizers 107 require associated frame buffers 111 to reorder pixels into screen refresh order. The output of frame buffer 111, or rasterizer 107 if no frame buffer 111 exists, is a stream of pixels, where each pixel contains one color associated with one screen pixel.

Figure 2A:
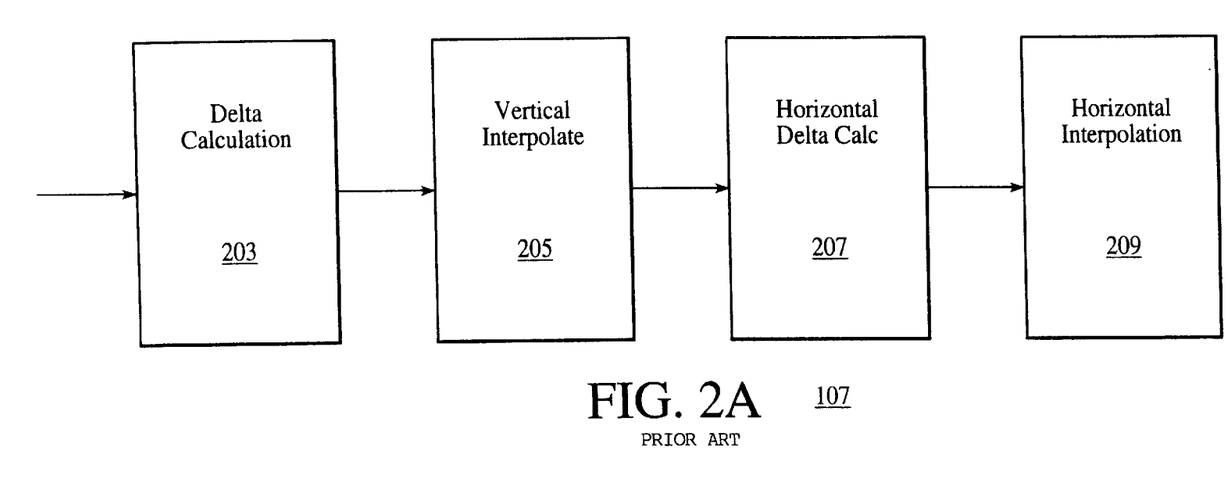
FIG. 2A is a block diagram of a conventional rasterizer implemented within the embodiments of FIGS. 1A, 1B.

With reference to FIG. 2A, conventional rasterizer 107 is shown which outputs pixels in polygon order. The rasterizer conventional includes slope, vertical, horizontal slope, and horizontal processing units 203, 205, 207, 209.

Figure 2B:
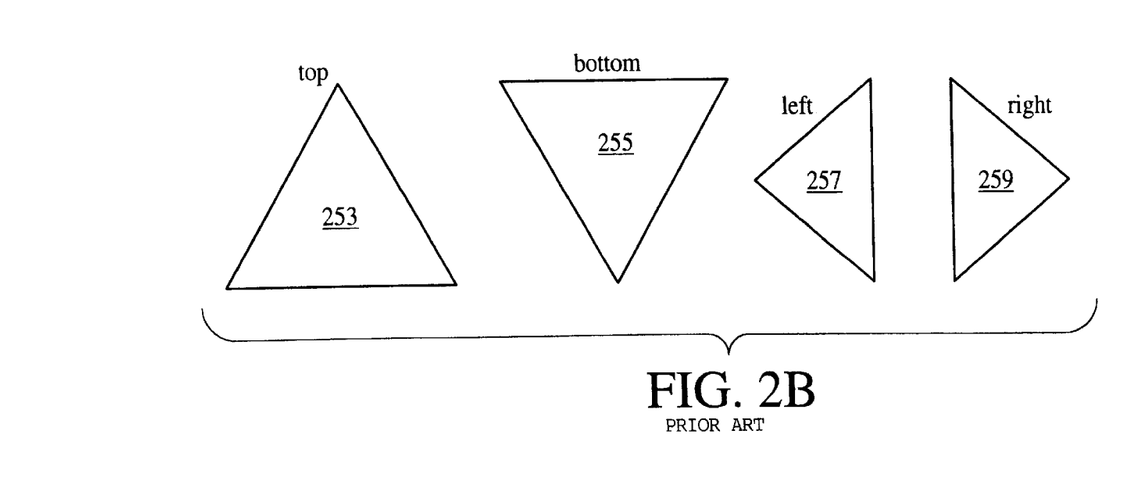
FIG. 2B is a block diagram of polygon primitives produced by the embodiments of FIGS. 1A, 1B.

An example of triangle primitives rasterized by rasterizer 107 are shown in FIG. 2B. The triangles are type classified as: top, bottom, left, and right facing triangles 253, 255, 257, 259.

Conventionally, rasterizing occurs in three steps. The first rasterizing step converts the three point format of the triangle into three edges. The edges are usually described in the form of By+C. The second rasterizing step evaluates points along the edges of the triangle. There are two interpolators utilized in the second step, one for the left edge and one for the right edge. The output of the interpolator are referred to as spans, which are horizontal lines defined y a y-value, left and right x-values and any other parameters of the polygon defined at the ends of the span. The third rasterizing step also utilizes an interpolator which accepts a span and outputs the pixels that the span defines. For each pixel, the interpolator outputs the y-value and x-value of the current pixel and the value of the parameters of each pixel.

Graphics computer systems 151 utilizing such conventional rasterizers 107 require frame buffer 111 to reorder the pixels into the order needed by display 109 and also require a color unit to determine which pixel is visible and carries the color to be utilized by the associated screen pixel. Software applying the painters' algorithm provide a simple process to perform this task, which follows the rule that the last pixel sent to a pixel in frame buffer 111 replaces the pixel stored within frame buffer 111. However, in order to perform this operation, the polygon data sent to rasterizer 107 must be sorted from back-to-front.

Conventional hardware, such as SGI-GTX manufactured by Silicon Graphics, Inc., that does not require back-to-front sorting applies a z-buffer algorithm. Z-buffer algorithms utilize an additional buffer, referred to as the z-buffer, that stores range values (z-values) as described by K. Akeley and T. Jermoluk in "High-Performance Polygon Rendering", SIGGRAPH 88, 239–246.The pixel currently stored in frame buffer 111 and z-buffer is read by rasterizer 107 and the z-values of the new pixel and the pixel in frame buffer 111 are compared by rasterizer 107. If the new pixel is in front of the pixel in frame buffer 111 then the new pixel replaces the pixel in frame buffer 111, otherwise the new pixel is discarded. Some algorithms that determine the color of a screen pixel require information about more than just the frontmost polygon that intersects a screen pixel. Examples of cases where information about multiple polygons is needed include: anti-aliasing, CSG (constructional solid geometry), and transparency. One solution is to modify frame buffer 111 to hold a list of pixels at each point and after all polygons have been rendered process the list of rendered pixels at each screen pixel into a single color.

Other work has been done to modify graphics computer systems which use z-buffers to provide some of the features of the multiple pixel/screen pixel system without the cost of the memory needed by the multiple pixel/screen pixel system, by for example drawing the polygons in front-to-back or back-to-front order.

Rasterizers 107 that operate on data in polygon order are efficient, since a single interpolator rasterizes multiple polygons and, as long as there are polygons to be rasterized, the interpolator can be rendering. One of the disadvantages is that the pixels are not output in raster order and need to be reordered by frame buffer 111. Additionally, since the pixels are output in polygon order, it is impossible to merge pixels from different polygons into a single screen pixel before the pixels are written into frame buffer 111 as a result the bandwidth needed into frame buffer 111 is very high. Another disadvantage is that if the color algorithm requires information about more than one rasterized pixel in each screen pixel either a very large frame buffer must be used or the polygons must be presorted, and presorted does not work in all cases.

Figure 3:
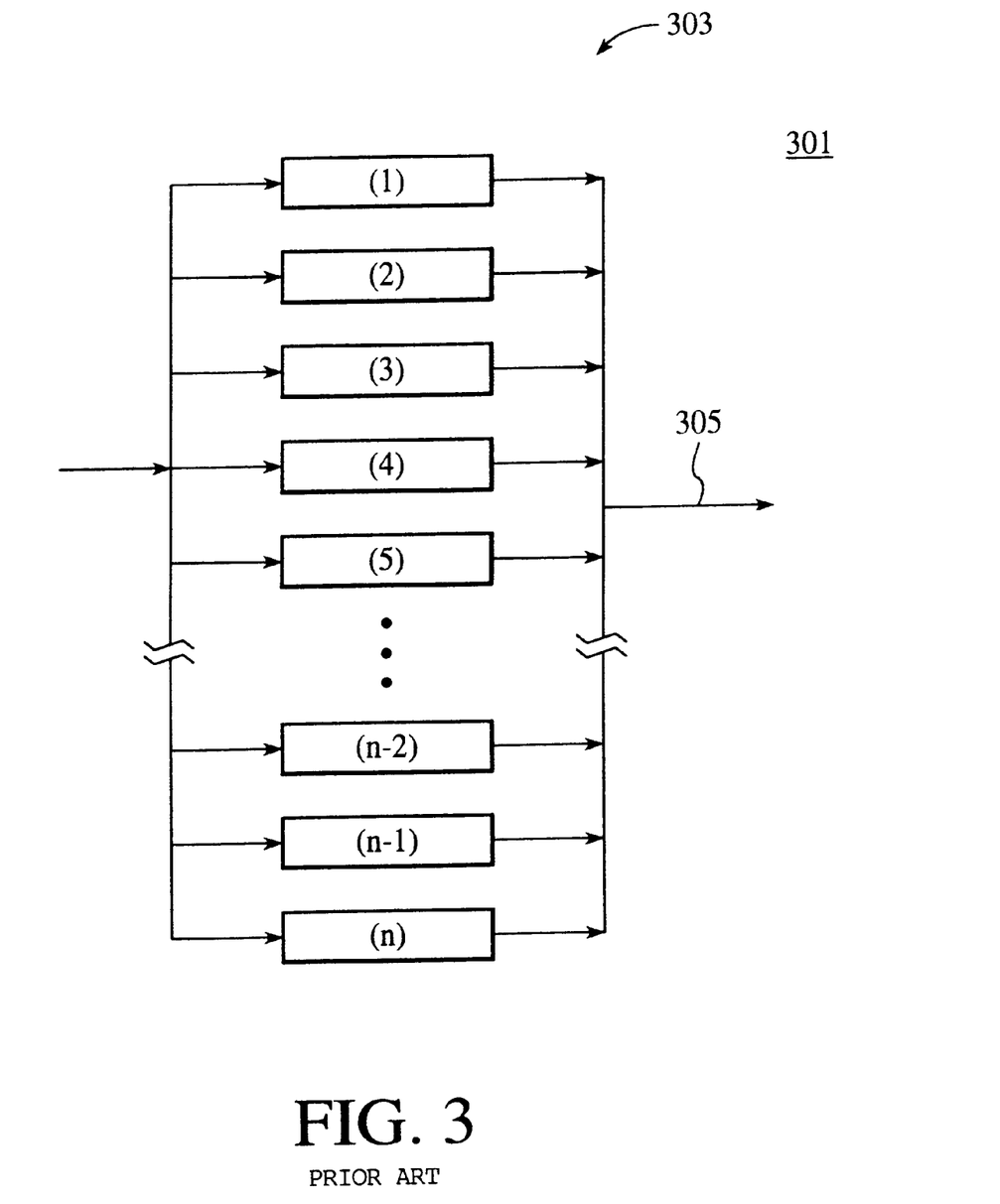
FIG. 3 is a block diagram of a conventional array of interpolators implemented within the embodiments of FIGS. 1A, 1B.

A technique used to produce and transmit pixels in raster order is implemented with processor per primitive architecture 301 as partially shown in FIG. 3. Processor architecture 301 includes array 303 of n processor-interpolator pairs. Each processor-interpolator pair of array 303 renders one polygon over the entire screen. The interpolators used in a processor per primitive are similar to those interpolators used in the polygon order system except that since the pixels are output in raster order there is no need to output the coordinate of each pixel. Instead, there is a need to indicate whether or not a given polygon intersects the current pixel. This can be done by comparing the y-values (vertical coordinate) of the current pixels against the top and bottom of the triangle and the x-values (horizontal coordinate) of the current pixels against the left and right edges of the span at the current y-value. The outputs of the interpolators of array 303 are connected to bus 305. The output data of the respective interpolators is merged into a single stream by selecting one of the interpolators that has a polygon that intersects the current pixel during each clock cycle and transmitting the pixel that the selected interpolator has generated, where a clock cycle is defined by the processor to coordinate transfers of data. During the following clock cycle, a next interpolator pixel is transmitted, and so on until all the active interpolators for the current screen pixel have transmitted their respectively generated pixels. Once an entire screen of pixels has been generated and transmitted, the interpolators then generate and transmit the associated screen pixels for a next screen and so forth. A method of merging pixels that may be applied with processor per primitive architecture 301 is to use several z-value compare units to determine which interpolator has generated the frontmost screen pixel and to enable the interpolator with the frontmost screen pixel to transmit the screen pixel data. Disadvantages of processor per primitive architecture 301 include the large size of each interpolator processor, the large number of interpolator processors required, and low efficiency. Methods to reduce some of the disadvantages include: presorting the polygons from top-to-bottom, designing architecture 301 with the least number of processors required for the most complex scanline, loading the processors from the top of the list of polygons and, as the current scan line moves below the bottom of a polygon loaded into a processor, removing the polygon from the processor to free up space for a new polygon to be read from the list of polygons. Despite these improvements, efficient utilization of processor resources is low and the number of processors needed is high. Therefore, there continues to be a need for a more efficient and compact architecture.

SUMMARY OF THE INVENTION

In accordance with the present invention, there is provided a graphics processor, graphics processing system, and method for generating a screen image that associates three-dimensional image data of multiple objects with respective screen pixels and determine the screen pixel characteristics in raster order utilizing a single interpolator.

The method of the present invention segments data describing three-dimensional objects within an x-y planar window into polygons, compares the polygons to determine unobstructed polygons, interpolates the polygon data and associates the characteristics of the unobstructed polygons screen pixels, and generates a data stream of screen pixels in raster order which is the order in which the screen pixels are scannable onto a display.

BRIEF DESCRIPTION OF THE DRAWINGS

Like reference numerals refer to corresponding components throughout the several diagrams. The most significant digit of each reference numeral corresponds to the figure number wherein the reference numeral first appears and the associated component identified.

DETAILED DESCRIPTION OF THE PREFERRED EMBODIMENTS

Figure 4:
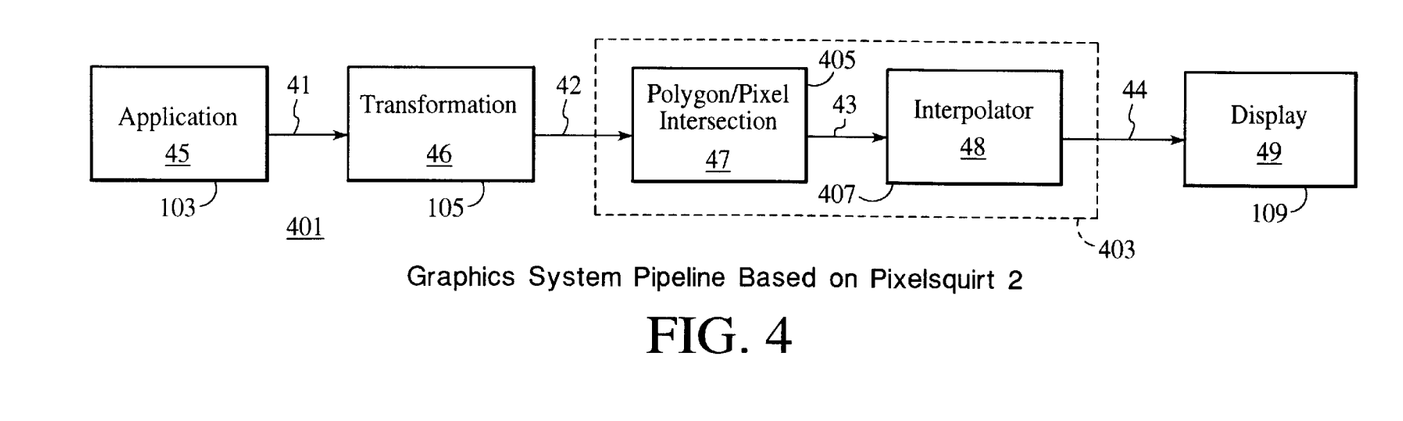
FIG. 4 is a block diagram of a graphics computer system according to the present invention.

Referring to FIG. 4, a block diagram is shown of graphics pipeline 401 wherein the present invention is implemented. Graphics system 401 may be implemented on a single semiconductor chip and may be optimized for specific applications to produce a three-dimensional graphics image utilizing integrated rasterizer 403. Graphics system 401 includes conventional application processor 103 which stores and operates conventional application software that generates the description of the scene to be rendered in terms of a list of graphics objects and data describing the graphics objects in a spacial or three-dimensional coordinate system, conventional transformation processor 105 which converts the data into a list of graphics primitives in two-dimensional screen space and a pre-defined rasterizer format, and rasterizer 403 which rasterizes the list of graphics primitives utilizing polygon/pixel intersection unit 405 and integrated interpolator 407.

Graphics system 401 may conventionally define a selected graphics primitive as a triangle. Each set of triangles are generated from the raw data describing the surface of the corresponding three-dimensional object. Triangles in screen (two-dimensional) space are defined by three coordinates indicating the three points (vertices) of the triangle. A coordinate in screen space is comprised of two values, which describe the horizontal (x) and vertical (y) position of a given point. Additional descriptive information which is commonly associated with a graphics primitive are parameters used in visibility calculations, color determination, and z-value identification of each point. The z-value indicates the distance from the viewer of that point which may also be referred to as a depth position. With the z-value known at all three points of the triangle the z-value of any point inside the triangle can be determined, since a triangle is, by definition, planar, and the coordinates and the z-value define the plane of the triangle. The z-value is used in visibility calculations since the z-values of two polygons at the same point can be compared to determine which is in front of the other.

Other parameters are used to determine the color of points over the surface of the triangle. A common and popular method is Gouraud shading. This method approximates the behavior of diffuse illumination. The color at each point of the triangle is determined in the transformation stage by using a conventional lighting algorithm, for instance as discussed by Foley-vanDam in *Computer Graphics and Practice*. A lighting algorithm returns a color based on inputs that include geometry data, such as normals, color and material data for the object that is being generated, and location, color, and other specifications of the lighting sources in the scene. The color is usually specified as a triplet of red, green and blue values. Each color value is treated as an independent parameter and the value can be determined at any point inside the triangle since the color is specified at the three points of the triangle. Other parameters which may be used include coordinates for texture mapping. Texture mapping is a type of mapping that applies an image (the texture) to a triangle in a scene. The texture coordinate parameters define a triangle in the texture image and this triangle image is warped to fit the triangle being rendered as part of the scene. In general a triangle is specified by providing the three coordinates of the points of the triangle and, at each point, providing the value of the parameters that are used in this system.

Rasterizer 403 processes the list of graphics primitives from transformation processor 105 and renders the scene in refresh order. A current screen pixel is defined as the pixel in the scene that is currently being rendered. Rasterizer 403 initially defines the current screen pixel as the top-left most pixel in the output image. As the scene is rendered, the current screen pixel advances to the right of the screen on the same horizontal scan line. Once rasterizer 403 has advanced to the rightmost pixel of the scan line, rasterizer 403 defines the next current screen pixel as the first (leftmost) pixel on the next scan line down. Other alternative refresh (rendering) processes may be applied by rasterizer 403 which do not render horizontal lines sequentially, such as interlaced processing in which the scene is drawn twice and each rendering of a scene comprises every other horizontal scan line, or, simple reordering processing in which the scene is rendered from top-to-bottom with vertical scan lines and rasterizer increments on a columnar basis from left-to-right as each vertical line is drawn.

Polygon/pixel intersection unit 405 includes an array of processors. The processors are similar to the processors in a processor per primitive system. Each processor is loaded with one triangle and processes the respective triangle regardless whether the triangle intersects with the current pixel. Each processor identifies whether the loaded primitive intersects the current screen pixel. Since only a single shared interpolator 407 is utilized, logic to interpolate parameters in each processor is not needed. Interpolator 407 is needed to generate the interpolated parameters for each processor only when the current screen pixel intersects the area of the triangle loaded in a particular processor.

The polygons (primitives) read from transformation processor 105 are loaded into available processors within polygon/pixel intersect unit 405. Each processor rasterizes one triangle; however, the utility efficiency of the processors is improved by reusing processors to operate on multiple triangles during a single image rendering. Once the current screen pixel is below the bottom of a triangle, the processor is done rendering that triangle. If a processor is done rendering a triangle, the processor can be loaded with a new triangle as long as the top of the new triangle is below the current screen pixel. The process may be implemented by sorting the triangles from top to bottom using the topmost point in each triangle. This operation is performed after graphics transformations are completed by transformation processor 105, or alternatively by rasterizer 403.

The processor array of intersect unit 405 also includes logic utilized to scan through the pixels on the screen. The pixels are scanned in raster order and the output of the scanning logic is the current screen pixel. For each screen pixel, the outputs of all the processors are scanned. The output of each processor indicates if the current screen pixel intersects the area of the triangle. This is done to find which triangles intersect each screen pixel. The output of the processor array is a stream of screen pixels where each pixel is defined by a list of polygon primitives. The polygons in each screen pixel list are those that intersect the screen pixel.

Interpolator 407 reads in the polygon data and calculates the value of the parameters for each screen pixel by direct evaluation of the associated polygon data. The direct evaluation method organizes the polygon data into a format that describes the respective polygons in terms of equations of the form $v=f(x,y)$. This organization is developed by applying conventional mathematical rules, such as $y=mx+b$ and two points to describe a line. The direct evaluation method evaluates a parameter at an arbitrary point within the area of the triangle polygon directly by applying the respective equation $v=f(x,y)$.

After being characterized by interpolator 407, the respective screen pixels are transmitted by rasterizer 403 in conventional format and in the same order as the current screen pixel is scanned on display 109. Therefore, the rendered image may be transmitted directly to display 109 from rasterizer 403. However, frame buffer 111 may be implemented between rasterizer 403 and display 109 to delay transmission of screen pixel data. If so, frame buffer 111 receives and transmits the rendered image in the same sequential raster order.

Figure 5:
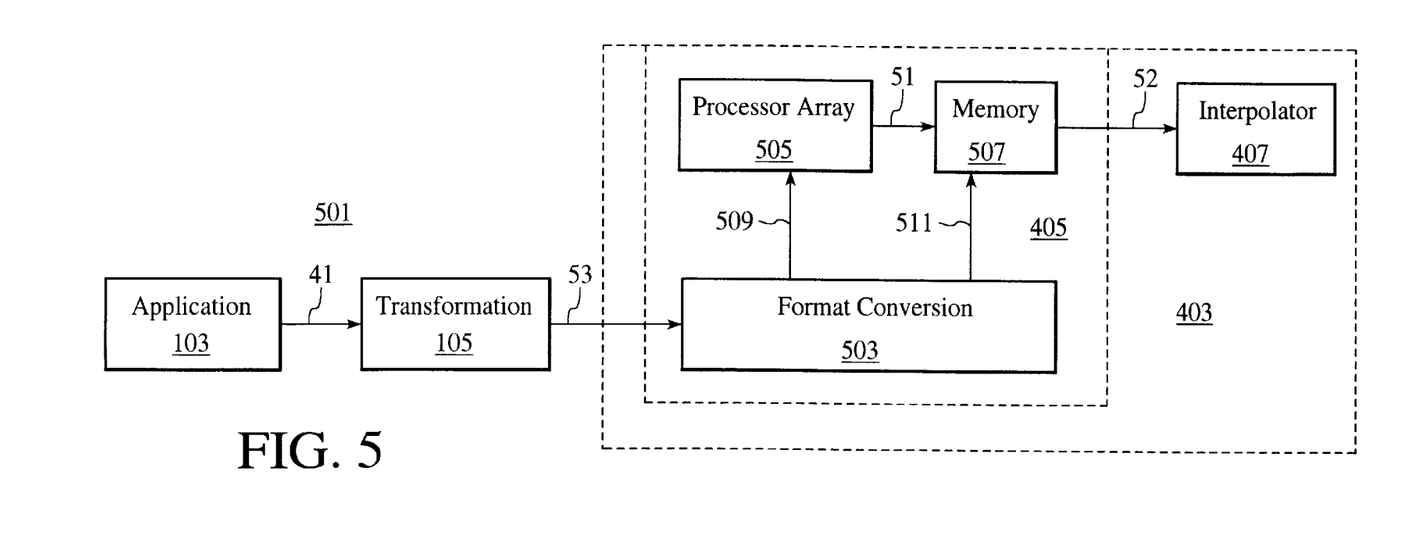
FIG. 5 is a block diagram of a graphics processor implemented according to the present invention within the graphics computer system of FIG. 4.

Referring to FIG. 5, a flow diagram of an embodiment of graphics computer system processor 501 including integrated rasterizer 403 is shown which implements the process of the invention. Graphics system 501 is preferably implemented in circuitry that is more dense for memory than logic. Logic implementation of graphics system 501 is preferable if the technology used to construct graphics system 501 recommends or is preferably implemented in logic rather than memory.

Integrated rasterizer 403 includes format converter 503 that accepts the polygons from transformation unit 105 and transmits the geometry of the triangles to processor array 505 and the parameter data to parameter memory 507. This embodiment of rasterizer 403 separates the processing of geometry data from the processing of parameter data and therefore this data needs to be separated and put into a form by format converter 503 that is readable by the processors within array 505 and interpolator 407.

The format of the polygon data provided to format converter 503 is machine-dependent. The assumption used in this specification is that the polygons primitives output from transformation unit 105 are triangles which are described by three points, each point including the coordinate of the point and the values of parameters at the point.

If the format of the polygons output from transformation unit 105 into format converter 503 are not triangles, such as squares, rectangles, pentagons, or circles, or are triangles not in a three point format then format converter 503 must be modified accordingly. In such cases, the polygons in the alternative format may be converted into three point triangles by format converter 503 and then processed as described herein. Alternatively, rasterizer 403 may be modified to directly process the alternative primitives or primitive format, such modification may include the application of polar or transform, such as fourier- or z-transform, coordinate systems.

Format converter 503 calculates delta values and performs setup operations, such as with the geometry data to be transferred to processor array 505. The processors in processor array 505 are designed to perform forward-based differencing operations to calculate the edges of the triangle. Forward differencing requires data describing the edges of the respective polygons to be supplied to the respective processors at a starting value and a delta value. The starting value is the horizontal position of an edge on the first scan line that the edge is active. The delta value is the difference between the position of the edge on the first scan line and the position of the edge on the next scan line, and since the edge is a straight line, the delta value is the difference between the horizontal position of the edge on any two adjacent scan lines. The polygon primitive data supplied to format converter 503 are provided in a three point format. Format converter 503 calculates the delta values for the respective processors. After converting the geometry data, the converted geometry data in the delta format is transmitted by format converter 503 over bus 509 to processor array 505.

Format converter 503 also uses the triangle data to transmit the parameter data in a format readable by interpolator 407. Interpolator 407 utilizes the triangle data to calculate the values of the parameters at a point on the triangle. Interpolator 407 preferably uses the plane equation $v=Ax+By+C$ to calculate the value of a parameter of a triangle at a certain point within the area of the triangle. Format converter 503 converts the parameter data associated with each point of the respective triangle into the A, B, C values of the plane equation utilizing the associated geometry data.

The three points of each triangle are referred to as: a, b, and c. Each point is defined by a vector including a coordinate, which is comprised of an x and y value respectively corresponding to horizontal and vertical directions, and the associated parameters. Each parameter is processed individually, and therefore only one parameter v is shown in the following equations.

The conversion is performed utilizing the following steps:

First, the three points a, b, c are re-written into vectors ab and ac utilizing the following calculations:

ab.x=b.x−a.x , ab.y=b.y−a.y , ab.v=b.v−a.v ac.x=c.x−a.x , ac.y=c.y−a.y , ac.v=c.v−a.v where a.x is the x component a.y is the y component and a.v is the parameter of point a, such that point a is defined as a.x,a.y,a.v.

A=ic/kc

B=jc/kc

C=(ic*a.x+jc*a.y+kc*a.v)/kc where ic=(ab.y*ac.v−ab.v*ac.y)

jc=(ab.v*ac.x−ab.x*ac.v)

kc=(ab.x*ac.y−ab.y*ac.x)

Once the parameter data has been converted into A, B, C values, format converter 503 transmits the data over bus 511 into memory array 507.

The parameter and geometry data need to remain associated so that the interpolator can calculate the correct value for parameters when it outputs the rendered pixels.

The parameter and geometry data of each triangle is associated by assignment of a common index number by format converter 503. The processors in processor array 505 and portions of parameter memory 507 which respectively receive the parameter and geometry data of a triangle are also respectively assigned with the associated index numbers. A given triangle's data is assigned an index number that is not currently in use by format converter 503. The geometry data output from format converter 503 is stored in the processor of array 505 identified by the same index number as the index number assigned to the triangle and the triangle's geometry data. The parameter data output from format converter 503 is stored in memory 507 at a location addressed by the same index number as the index number assigned to the original triangle and the triangle's geometry data. In the case when a processor indicates that the triangle contained by the processor intersects the current screen pixel, the index number of the processor may be used to address the portion of memory 507 containing the parameter data and to transfer the data to interpolator 407 which calculates the value of the parameters at the current screen pixel.

Processor array 505 includes n processors where the number n of processors, which should be greater than the number of triangles to be rendered, is defined by a graphics system designer. Processor array 505 is loaded with the triangle geometry data output from format converter 503, such that each processor in array 505 is loaded with the geometry data from one triangle. Each of the processors determines whether the current screen pixel is within the area defined by the geometry of the triangle loaded into the processor. Array 505 renders one triangle at a time in raster order, where raster order is defined as that order in which the screen pixels in a scene are scanned. Each processor renders one triangle, such that all the pixels that result from intersecting triangles with a screen pixel are output by the respective processors before any pixels in the next screen pixel are output. Thus, the scene to be displayed is rendered by processor array 505 in raster order and is transferred by array 505 to memory 507 as a stream of screen pixels.

Each pixel output from array 505 is defined by a list of tokens produced by the processors of array 505. Each token is produced by a respective processor to indicate whether the triangle assigned to the processor intersects the screen pixel. A token includes an index number and two flags. The index number is the index number of the triangle from which the geometry data was generated and is used to look up the parameter data for that triangle in memory 507. The parameter data for that triangle is also associated with the same index number and is stored in memory 507 at the address indicated by the index number. The two flag bits are defined as notvalid and last. When set, the last flag indicates that the particular token is the last token in a list of tokens associated with a screen pixel and the notvalid flag indicates that the particular token is not valid. In the case where a list of tokens contains a single token that has both the notvalid and last flag set, no triangles intersect the current screen pixel. If the notvalid flag is not set, the token indicates that the associated triangle intersects the current screen pixel.

The four possible token states that may be applied are therefore:
- valid, containing an index that refers to a polygon (triangle) and indicates that the polygon (triangle) intersects the screen pixel and may be visible or contribute to the color of the screen pixel;
- lastvalid, containing an index that refers to a polygon (triangle) and indicates that the polygon intersects with the screen pixel and may be visible or contribute to the color of the screen pixel, and that this is the last polygon associated with the screen pixel;
- last notvalid, indicating that there are no polygons associated with the screen pixel, and the next token will be for the next screen pixel; and,
- notvalid, containing an index that refers to a polygon (triangle) and indicates that the polygon (triangle) does not intersect the screen pixel which further indicates that this token is a null token and will not be generated by the processor array.

Memory 507 has a number of entries equal to the number of processors of array 505. Each memory address is associated with one processor and contains the parameter data from the triangle whose geometry data is stored with the respective processor. Memory 505 is addressed with the index numbers. Each entry in memory 507 contains the ABC values for all parameters of the polygon. Memory 507 provides the parameter data to interpolator 407. During each clock cycle, a token is read from processor array 505. The index number in the token is used by array 505 to address and fetch the parameter data set from memory 507. The parameter set and the flags from the respective token are then transmitted to interpolator 407.

Interpolator 407 evaluates the data read from memory 507 to determine the values of the parameters at the current pixel. Interpolator 407 determines the values of the parameters by evaluating the equation Ax+By+C for each parameter and utilizing the A, B, C values read from memory 507. From these values, interpolator 407 generates the rendered screen pixels in a format conventionally readable by display 109.

Figure 6:
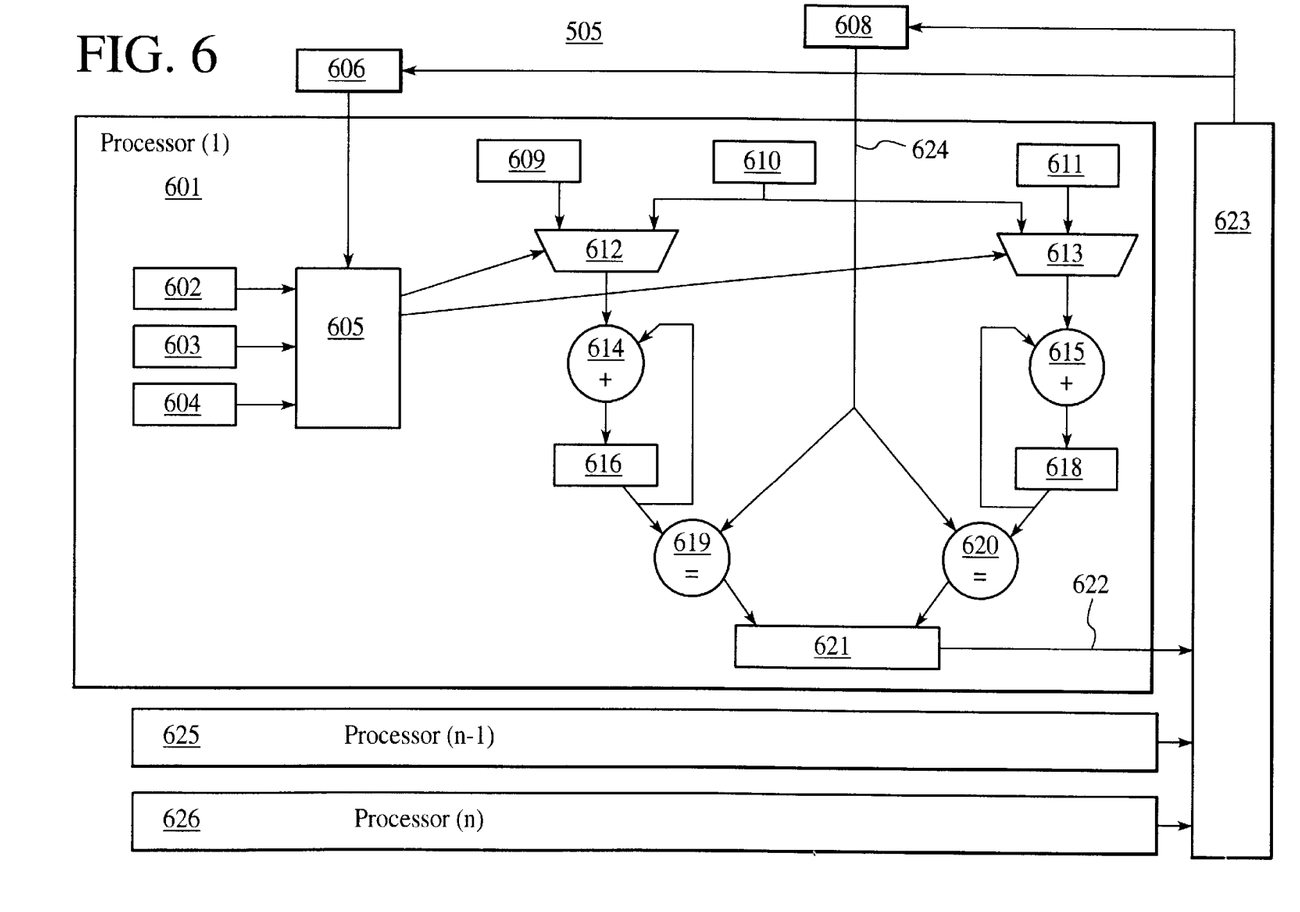
FIG. 6 is a block diagram representation of the processor array implemented within the rasterizer of FIG. 4.

Referring to FIG. 6, a block diagram is shown of processor array 505. Processor array 505 includes two counters 606, 608 which indicate the current screen pixel. Processor array 505 includes a plurality of n processors which may be sixteen or more. The 1st, n-1st, and nth processors 601, 625, 626 are shown in FIG. 6 as representative members of processor array 505. Processor 601 is shown in detail as representative of the various processors in array 505. The processors of array 505 calculate the intersections of the respective triangles and screen pixels and array 505 transmits the list of triangles that intersect the current screen pixel. Each processor determines if the triangle stored in the processor intersects the current screen pixel and transmits a signal to priority encoder 623 that indicates the result of the intersection determination. Priority encoder 623 converts the intersection determination signal into the index number associated with the triangle that intersects the current pixel. Priority encoder 623 includes the array control logic of processor array 505. The control logic in priority encoder 623 controls counters 606, 608 so that the current screen pixel remains unchanged for the same number of clock cycles as there are intersections. Thus, priority encoder 623 transmits one index number for each processor with an active output (valid token). Priority encoder 623 also sets the two flags in each token that is output.

For example, if there are sixteen processors in processor array 505 with four processors containing triangles that intersect the current screen pixel and these processors have index numbers 4, 6, 10, 11, then priority encoder 623 will utilize four clock cycles to transmit the respective tokens. The fourth token will have the last flag set which causes priority encoder 623 to increment the clocks 606, 608 to identify the next current screen pixel to be rendered beginning with the next clock cycle.

Once the last pixel of a frame has been rendered, priority encoder 623 resets counters 606, 608 to 0,0 which identifies the initial current screen pixel for a fame at the top left of the screen. Counters 606, 608 each include a limit register to indicate the maximum value for each counter, and define the resolution of the screen. When horizontal (x) counter 606 reaches a pre-determined maximum value, such as 1024, a next value will be zero and vertical (y) counter 608 is incremented by one. When horizontal and vertical counters 606, 608 reach pre-determined maximum values, for instance 1024, the current screen pixel is the last pixel for a frame. After a new display list is provided to rasterizer 403 by transformation processor 105, the current screen pixel is reset to zero and the process for rendering a frame begins anew.

The processors of array 505 are loaded with the converted triangles from format converter 503 shown in FIG. 5. If processor array 505 is designed so that the number of processors is greater than the number of triangles in a scene, then the various processors of array 505 are loaded with the triangles before the scene is rendered. Each triangle is described by various start positions and deltas, whose values are loaded into a set of registers within the respective processor.

According to the process implemented by graphics processor 401, the triangles are transmitted from transformation processor 105 in a defined order, sorted by the topmost point from top-to-bottom. At the beginning of the rendering of a scene, each processor of array 505 is loaded with a triangle. As long as the number of processors is greater than the number of triangles that intersect the first scanline, then all triangles that may be drawn on the first scanline are loaded into processors. Each of the triangles are drawn by the respective processors. Any polygons that do not intersect the current scanline are identified by the respective processor and remain inactive in the processor for the first scanline. If the bottom of a triangle is above the next scanline then the processor is marked as empty and a new triangle is loaded into the processor before the next scanline. In this manner, processor array 505 is kept loaded with triangles that either intersect the current scanline or will intersect a future scanline.

Each processor includes registers 602, 603, 604, 609, 610, 611, 616 and 618 which store the data associated with respective triangles. Register 602 stores the top y value of the triangle. Register 603 stores the middle y value of the polygon, where one edge ends and another begins. Register 604 stores the bottom y of a triangle. Register 609 stores the initial left delta which defines the slope of the left edge. Register 611 stores the initial right delta which defines the slope of the right edge. Register 610 stores the third delta which defines the second slope of the left or right side of the triangle. Register 616 stores the horizontal position of the left edge of the triangle. Register 618 stores the horizontal position of the right edge of the triangle.

The top y value may be used to indicate where the triangle starts in a scene. The middle value may be used in two of the four classifications of triangles. The classifications of triangles applied by processor array 505 is shown in FIG. 2B. Top and bottom triangles have one horizontal edge while left and right triangles can be viewed as always having one edge on the right or left side and two edges on the other side. Control unit 605 classifies the respective triangle and stores two identification control bits which indicate the triangle classification. If the triangle is either right or left, then the middle y value indicates on which scanline the side with two edges should switch from the upper edge to the lower edge. The initial deltas are the slopes of the left and right edges of triangle. If the triangle is either left or right, then there is a second left or right edge and the delta stored in the initial register of the side with two edges is the slope of the upper edge. The slope of the lower edge is stored in third delta register 610. If the triangle has a top or bottom classification, then the contents of middle y register 603 and third delta register 610 are not used. The left and right horizontal registers 616, 618 are loaded with the initial horizontal position of the two starting edges. If the triangle has either left, right or top classifications, then the two values are equal to the horizontal position of the topmost point. If the triangle has a bottom classification, then the triangle has two topmost points which are located at the same vertical position. The horizontal position of the leftmost points is loaded into left edge register 616 and the horizontal position of the rightmost point is loaded into right edge register 618.

Control unit 605 compares top, middle, and bottom y values stored in registers 602, 603, 604 with the current y value stored in counter 606 to determine which edges of the triangle to use. When the current y value is above the top y value of the triangle, then the current scanline is above the triangle and the triangle is not visible in the scanline. When the current scanline has not yet reached the triangle, the respective processor is off-line and the contents of the respective registers within the processor, specifically the left and right registers 616, 618, are left unchanged. When the current scanline reaches the top of the triangle, the processor is placed on-line by priority encoder 623 and the stored triangle begins the rendering process.

If the current y value is between the top and middle y values, then the triangle is visible in the scanline and the left and right edge positions must be updated. The left and right registers are updated by adding the delta values, the contents of left delta value register 609 for the left edge and the contents of right delta value register 611 for the right value, to the values stored in left and right registers 616, 618.

If the triangle is a "left" or "right" triangle, then the comparison of the middle y value to the current y position is used. If the current y value is between the middle y value and the bottom y value, then either the left or right edge switches from the initial edge used by the processor on that side of the triangle to the third edge of the triangle. If the triangle is a left triangle and the y value is between the middle and bottom y values, then the contents of left value register 616 is incremented by the contents of third delta register 610 and the contents of right value register 618 is incremented by the contents of right delta register 611. If the triangle is a right triangle and the y value is between the middle and bottom y values, then the contents of left value register 616 is incremented by the contents of left delta register 609 and the contents of right value register 618 is incremented by the contents of third delta value register 610. Since the third delta value is the slope of the third edge and the beginning of the third edge is the location where the previous edge ends, the result of switching to the third delta value is to switch to the third edge.

If the current y value is below the bottom y value, then the triangle is not visible on the current scanline and will not be visible on any scanlines below the current scanline. The triangle data contains no more useful information in the rendering of the screen pixels. Therefore, the processor containing the associated triangle data may be reloaded by writing the data associated with another triangle over the data of the prior triangle.

The contents of left and right value registers 619, 620 describe the left and right boundaries of the area covered by the triangle on the current scanline. This area is generally called a span of the triangle. If the current screen pixel is between the left and right bounds of the triangle then the triangle intersects the current screen pixel and the processor transmits a valid token (corresponding to a logical true state). The current screen pixel is on the current scanline by definition since the current scanline is specified by the vertical position of the current screen pixel. Whether the current screen pixel is within the span of the triangle in the processor is determined by two equality comparators 619, 620 that compare the current horizontal position against the contents of left and right value registers 616, 618. Each equality comparator 619, 620 transmits a logical true signal when the current screen pixel is on either (or both) the left or/and right edge of the span. State machine 621 indicates if the current screen pixel is inside the span with a one bit state signal. When the left comparison is logically true the state of the state machine is set to inside and when the right comparison is logically true the state is reset to outside.

The truth table of the stage machine is as follows:

TABLE 1

Truth Table of State Machine

| lefteg | righteg | current state | new state |
|--------|---------|---------------|-----------|
| 0 | 0 | 0 | 0 |
| 0 | 0 | 1 | 1 |
| 0 | 1 | x | 0 |
| 1 | 0 | x | 1 |
| 1 | 1 | x | 0 | where 'lefteq' and 'righteq' are the outputs of the two comparators 619, 620. 'lefteq' is the result of comparing the current screen pixel to the left horizontal register and 'righteq' is the result of comparing the current screen pixel to the right horizontal register. The current state is the state of the machine during the current clock cycle. A positive state indicates that the triangle is active (valid) at the current pixel. The new state is the state of the machine during the next clock cycle. The state of state machine 621 is output to priority encoder 623.

With further reference to FIG. 5, triangle parameter memory 507 reads in the tokens output from priority encoder 623 in processor array 505 and replaces the index in each token with the contents of parameter memory 507 at the location addressed by the index from the token. The new token, containing the parameter data is then output to interpolator 407. The parameter is needed by interpolator 407 to calculate the values of the parameters over the surface of the polygon. An alternative to utilizing tokens is to store the parameter data in each processor along with the triangle geometry and to include a multiplexer connecting to priority encoder 623 so that priority encoder 623 outputs the triangle parameter data instead of the index. The alternative embodiment would require an increased size of the data that flows through processor array 505 and a corresponding increase in the size of the circuitry, since storing data in memory 507 is more area efficient than storing the data in registers within each processor of array 505.

Figure 7:
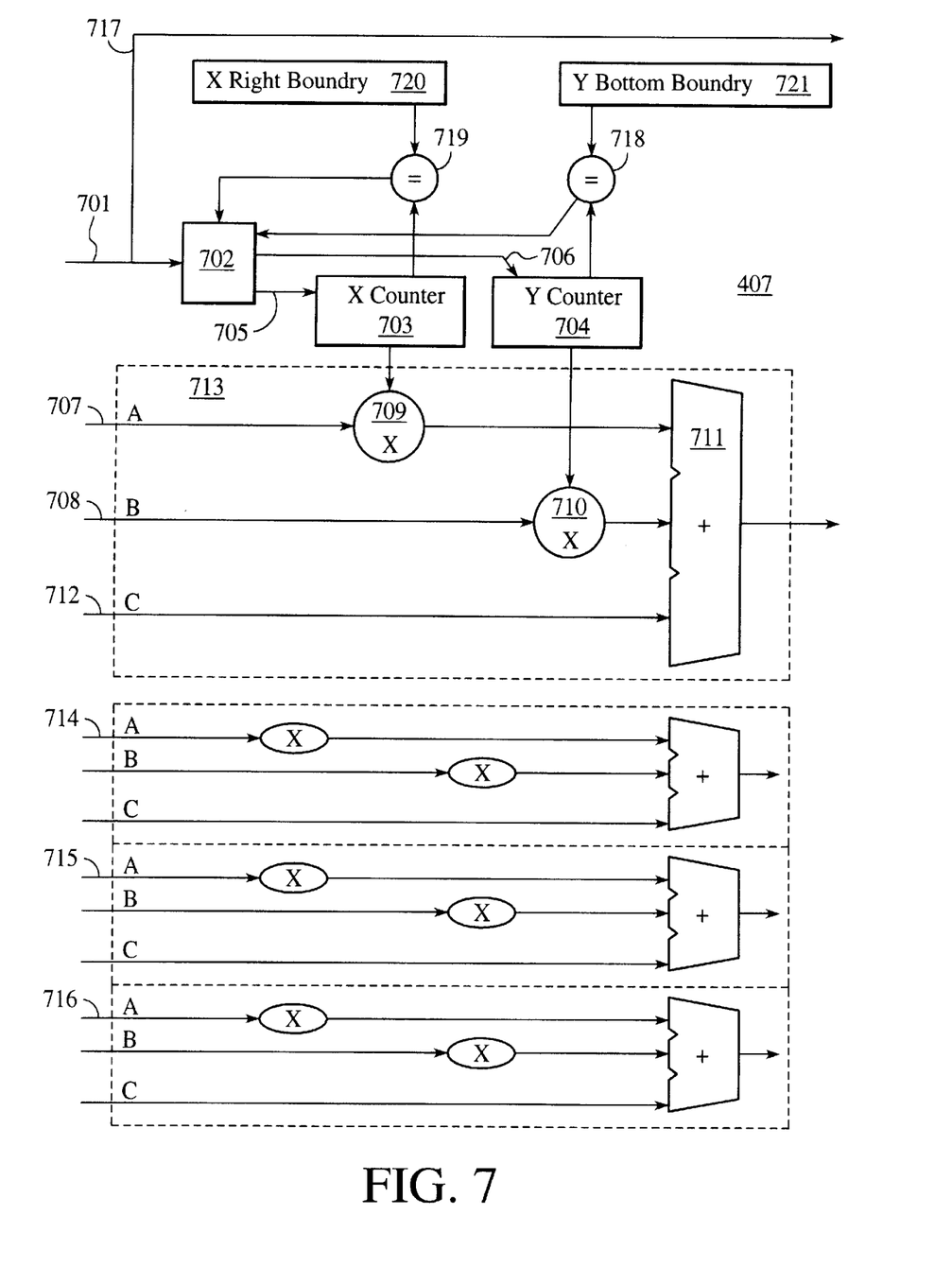
FIG. 7 is a block diagram representation of the interpolator processor implemented within the processor of FIG. 5.

A flow diagram of interpolator 407 utilized within graphics processor 501 is shown in FIG. 7. Interpolator 407 calculates the value of the parameters of a triangle at the intersection of the current screen pixel and the surface of the triangle. It calculates the values of the parameters by direct evaluation. Since graphics processor 501 has a pipeline design, processor array 505 generates tokens and then uploads parameter data from parameter memory 507 before transmitting the tokens to interpolator 407. This procedure delays the arrival of tokens with parameter data at interpolator 407 which may be required for a screen pixel that was before the current screen pixel in processor array 505. Interpolator 407 therefore determines an interpolator current screen pixel with two counters 703, 704, counter 703 tracks x values and counter 704 tracks y values.

Counters 703, 704 are controlled by the flags of the incoming tokens. The "last" flag indicates that the list of tokens that make up a screen pixel has ended and that counters should be advanced to the next screen pixel. Interpolator 407 includes two equality comparators 718, 719 to checks for bounds, two registers 720, 721 that store the right and bottom boundaries of the screen, and decoder 702 that controls counters 703, 704 based on the flags from the incoming token and the results of comparators 718, 719.

When the last flag is set for the incoming triangle, decoder 602 increments horizontal counter 703. The value stored in register 720 is the right horizontal boundary of the screen and is loaded by a host computer system when the computer system is initialized or is a fixed value if the resolution is fixed. Similarly, the value stored in register 721 contains the bottom of the screen and is also loaded at initialization. If the value stored in horizontal counter 703 is equal to the value stored in x boundary register 720, then, when the next triangle with the last valid flag set is received, x value counter 703 is reset to zero and y value counter 704 is incremented by one. If the value stored by y counter 704 is equal to the value stored in y boundary register 718, then, when x counter 703 is reset to zero, y counter 704 is reset to zero. When y counter 704 is zero and x counter 703 is zero then the current interpolator pixel is the top left pixel. When x and y counters 703, 704 are both equal to the boundary registers then the current pixel is the last on the screen and at the bottom right. Vertical counter 704 reset to zero indicates the completion of a scene. Horizontal counter 703 reset to zero indicates the end of a scanline. In this manner, the current screen pixel in the interpolator is updated, scanning from left-to-right and top-to-bottom, keeping in synchronization with the stream of tokens input from processor array 505.

The flag bits 701 remain in synchronization with the parameter processing and output with the rendering pixel and the outputs of blocks 714, 715, 716 on output 717.

The data path portion of interpolator 407 includes several individual interpolators 713, 714, 715, 716 of which interpolator 713 is shown in detail. Each of the interpolators 713, 714, 715, 716 evaluates one parameter of the triangle at the current screen pixel. The parameter value is determined by evaluating the equation Ax+By+C, where x and y are coordinates of the current interpolator screen pixel and A, B, and C are the parameter data associated with the triangle that is in the token transmitted from memory 507 into interpolator 407 and was originally generated from the three-point form of the triangle in format converter 503. For a Gouraud shaded triangle with z depth information, four interpolators 713, 714, 715, 716 are needed. Interpolator 713 is applied to the z-value and interpolators 714, 715, 716 are applied to the colors: red, green, and blue. Each interpolator 713, 714, 715, 716 is identical in structure, but the precision, in terms of bit-width of the inputs, outputs, and internal busses vary based on the precision needed by the parameter. Color commonly utilize an eight bit result while z-values use a sixteen bit result.

Each interpolator 713, 714, 715, 716 is comprised of two multipliers 709, 710 and three operand adder 711. Multiplier 709 multiplies the current horizontal value stored by counter 703 by A value input 707 associated with the triangle. Multiplier 709 performs the Ax portion of the Ax+By+C calculation of the parameter. Multiplier 710 multiplies the current vertical value stored in counter 704 by B value input 708 associated with the triangle. Multiplier 710 performs the By portion of the Ax+By+C calculation of the parameter. Three operand adder 711 outputs the sum of three inputs 707, 708, 712., Adder 711 can be constructed from two operand adders by summing two of the inputs in one two operand adder and summing the output of the first adder with the third input. Three operand adder 711 sums the results of multipliers 709, 710 with C value input 712 associated with the triangle. The result is the value of the parameter at the current screen pixel for the input triangle.

In an alternate embodiment of graphics processor 501, rather than convert the triangles into the Ax+By+C form, the parameter data is directly evaluated from the triangle data. This is accomplished by finding the values of the parameters at the intersection of the left and right edges with the current scanline and then finding the intersection of the line defined by those two endpoints with the current pixel. The alternate embodiment works directly from the three point definition of the triangle to determine the value of the parameter at a point on the screen. It does this by finding the left and right edges that intersect the current scanline. The edges are defined by their endpoints. The intersection of an edge and the scanline is found by solving the following equation:

$$v(y)=(y/(p2.y-p1.y)*(p2.v-p1.v))+p1.v$$

where x,y are the coordinates of a point, v is the parameter, p1.x is the x value of the first point, p1.y is the y value of the first point, p2.x is the x value of the second point, and p2.y is the y value of the second point.

The value of the parameter at both intersections is determined by the above equation and the value of x for both edges is calculated. The value of the parameter is found by the following equation:

$$v(y)=(x/(xright-xleft)*(vright-vleft))+vleft$$

where vleft and vright are the values of the parameter at each endpoint and xleft and xright are the horizontal position of the intersection.

The combined equation is:

$$v(y)=(x/(((y/(p4.y-p3.y)*(p4.x-p3.x)+p3.x)-$$

$$(y/(p2.y-p1.y)*(p2.x-p1.x)+p1.x))*((y/(p4.y-p3.y)*(p4.v-p3.v)+p3.v)-(y/(p2.y-p1.y)*(p2.v-p1.v)+p1.v))+$$

$$(y/(p2.y-p1.y)*(p2.v-p1.v)+p1.v)$$

where the edges are p1–p2 and p3–p4. The combined equation replaces Ax+By+C in the first embodiment.

Although the invention herein has been fully described, it may be appreciated that various of the structures described herein may be implemented either in hardware, software, or combinations thereof.

What is claimed is:

1. A graphics processor including:
   a transformation processor coupled to the application processor for producing a set of transformed data according to a set of instructions from a set of raw data describing at least one three-dimensional object within a bounded space extending from a display screen;
   a rasterizer coupled to the transformation processor for identifying portions of the transformed data mapping a pre-defined area of the display screen in parallel and sequentially rendering the identified portions of the transformed data in a pre-determined refresh order, the refresh order being the order that screen data is provided to the display screen to generate a screen image; and
   an interpolator coupled to the rasterizer for determining a visible portion of the identified portions associated with a respective selected area of the display and characterizing the selected area according to transformed data associated with the visible portion.

2. The graphics processor as in claim 1 wherein the graphics processor includes:
   an application processor including a software application, the software application including the set of instructions for generating the screen image.

3. The graphics processor as in claim 1 wherein the set of transformed data comprises multiple sets of primitive data respectively describing planar geometric shapes and parameter data associated with respective of the sets of primitive data, each of the planar geometric shapes describing a respective surface portion of the three-dimensional object.

4. The graphics processor as in claim 1 wherein the rasterizer includes:
   a processor array coupled to the transformation processor for identifying the portions of the transformed data.

5. A graphics processor including:
   a transformation processor coupled to the application processor for producing a set of transformed data according to a set of instructions from a set of raw data describing at least one three-dimensional object within a bounded space extending from a display screen;
   a rasterizer coupled to the transformation processor for identifying portions of the transformed data mapping a pre-defined area of the display screen in parallel and sequentially rendering the identified portions of the transformed data in a pre-determined refresh order, the refresh order being the order that screen data is provided to the display screen to generate a screen image, the rasterizer including
      a processor array coupled to the transformation processor for identifying the portions of the transformed data, the processor array including
         a plurality of primitive processors,
         each primitive processor storing no more than a single portion of transformed data describing a portion of a planar surface of the three-dimensional object,
         the processor array associating respective primitive processors containing single portions associated with respective areas of the display; and
   an interpolator coupled to the rasterizer for determining a visible portion of the identified portions associated with a respective selected area of the display and characterizing the selected area according to transformed data associated with the visible portion, wherein the interpolator includes
      a single interpolator processor connected to the processor array for sequentially evaluating and comparing data from each primitive processor associated with a selected respective area to determine the visible portion, the single interpolator determining the visible portion associated with each area of the display in the refresh order.

6. The graphics processor as in claim 1 wherein the predefined area comprises a screen pixel, a set of the screen pixels define a screen image for display on the display screen, the refresh order defining a pre-determined order of a data stream of the screen pixels for transmission to and illumination of the display.

7. The graphics processor as in claim 3 wherein the rasterizer includes a memory for storing the associated parameters of the respective multiple sets of primitive data.

8. A graphics processor system including:
   a graphics processor including:
      a transformation processor coupled to the application processor for producing a set of transformed data according to a set of instructions from a set of raw data describing at least one three-dimensional objects within a bounded space extending from a display screen;
      a rasterizer coupled to the transformation processor for identifying portions of the transformed data mapping a pre-defined area of the display screen in parallel and sequentially rendering the identified portions of the transformed data in a pre-determined refresh order, the refresh order being the order that screen data is provided to the display screen to generate a screen image;
      an interpolator coupled to the rasterizer for determining a visible portion of the identified portions of associated with a respective selected area of the display and characterizing the selected area according to transformed data associated with the visible portions; and
   a display producing an image by scanning the rasterized data in the refresh order.

9. The graphics processor system as in claim 8 including:
   a memory connecting to the graphics processor and storing the set of rasterized data.

10. The graphics processor system as in claim 8 including:
    a user interface providing access by a user to the graphics processor to accommodate the insertion of instructions and data by the user to the system.

11. The graphics processor system as in claim 8 wherein the graphics processor includes:
    an application processor including a software application, the software application including the set of instructions for generating the screen image.

12. The graphics processor system as in claim 8 wherein the set of transformed data comprises multiple sets of primitive data respectively describing planar geometric shapes and parameter data associated with respective of the sets of primitive data, each of the planar geometric shapes describing a respective surface portion of the three-dimensional object.

13. The graphics processor system as in claim 8 wherein the rasterizer further includes:
a processor array coupled to the transformation processor for identifying the portions of the transformed data.

14. A graphics processor including:
a graphics processor including:
a transformation processor coupled to the application processor for producing a set of transformed data according to a set of instructions from a set of raw data describing at least one three-dimensional objects within a bounded space extending from a display screen;
a rasterizer coupled to the transformation processor for identifying portions of the transformed data mapping a pre-defined area of the display screen in parallel and sequentially rendering the identified portions of the transformed data in a pre-determined refresh order, the refresh order being the order that screen data is provided to the display screen to generate a screen image, therein the rasterizer includes a processor array coupled to the transformation processor for identifying the portions of the transformed data, the processor array including;
a plurality of primitive processors,
each primitive processor storing no more than a single portion of transformed data describing a portion of a planar surface of the three-dimensional object,
the processor array associating respective primitive processors containing single portions associated with respective areas of the display; and
an interpolator coupled to the rasterizer for determining a visible portion of the identified portions of associated with a respective selected area of the display and characterizing the selected area according to transformed data associated with the visible portions; and
a display producing an image by scanning the rasterized data in the refresh order.

15. The graphics processor system as in claim 8 wherein the pre-defined area comprises a screen pixel, a set of the screen pixels define a screen image for display on the display screen, the refresh order defining a pre-determined order of a data stream of the screen pixels for transmission to and illumination of the display.

16. The graphics processor system as in claim 12 wherein the rasterizer includes a memory for storing the associated parameters of the respective multiple sets of primitive data.

17. A method for producing a graphics image including the steps of:
obtaining data describing a three-dimensional object within a space bounded in two directions x,y, the space including a reference plane in the x,y directions, the reference plane including an identifiable area;
transforming the data into geometric data blocks describing respective geometric surfaces, the geometric surfaces describing surface portions of the three-dimensional object;
identifying geometric data blocks which map the described geometric surface onto the identifiable area of the reference plane; and
identifying a visible data block defining a geometric surface that is nearest to the identifiable area along an axis extending perpendicularly from the area of those surfaces described by the associated data blocks.

18. The method as in claim 17 wherein the method includes:
generating the screen image according to a set of instructions.

19. A method for producing a graphics image including the steps of:
obtaining data describing a three-dimensional object within a space bounded in two directions x,y, the space including a reference plane in the x,y directions, the reference plane including an identifiable area;
transforming the data into geometric data blocks describing respective geometric surfaces, the geometric surfaces describing surface portions of the three-dimensional object;
identifying geometric data blocks which map the described geometric surface onto the identifiable area of the reference plane;
wherein the step identifying geometric data blocks identifies multiple of the geometric data blocks in parallel and sequentially renders the identified geometric data blocks in a pre-determined refresh order, the refresh order being the order that screen data produced from the geometric data blocks is provided to the display screen to generate a screen image; and
identifying a visible data block defining a geometric surface that is nearest to the identifiable area along an axis extending perpendicularly from the area of those surfaces described by the associated data blocks.

20. The method as in claim 17 including the steps of:
interpolating the visible data block to determine a point on the perpendicular axis;
characterizing the selected area according to transformed data associated with the point; and
generating a set of screen data characterizing the selected area and successively selected areas obtained by repeating the prior steps, the set of screen data being generated in refresh order for directly scanning a screen image onto a display.

21. A system for generating a graphical display from data describing at least one three-dimensional object, the system comprising:
a plurality of processors, each processor of the plurality of processors receiving a portion of the data for one of the at least one three-dimensional object, determining if a current position is located within the portion of the data, and providing an output if the current position is located within the portion of the data; and
a single interpolator coupled with the plurality of processors, the single interpolator being configured to provide information relating to a plurality of characteristics of the portion of the data in the processor in response to the processor providing the output.

22. The system of claim 21 wherein the data are rendered in refresh order.

23. A method for generating a graphical display from data describing at least one three-dimensional object, the method comprising:
(a) separating the data into a plurality of portions of data;
(b) providing each of the plurality of portions of data to a processor of a plurality of processors;
(c) for each of the plurality of portions of data, in the processor, determining if a current position is located with the portion of data and providing an output if the current position is located within the portion of data; and (d) providing information relating to a plurality of characteristics of the portion of the data in the processor from a single interpolator in response to the processor providing the output.

* * * * *